(12) United States Patent
Wesselmann et al.

(10) Patent No.: US 10,230,813 B2
(45) Date of Patent: Mar. 12, 2019

(54) NETWORK SYSTEM, COUPLING UNIT, AND METHOD FOR OPERATING A NETWORK SYSTEM

(71) Applicant: Phoenix Contact GmbH & Co. KG, Blomberg (DE)

(72) Inventors: Matthias Wesselmann, Springe (DE); Detlev Kuschke, Schieder-Schwalenberg (DE); Fabian Christ, Paderborn (DE)

(73) Assignee: Phoenix Contact GmbH & Co. KG, Blomberg (DE)

( * ) Notice: Subject to any disclaimer, the term of this patent is extended or adjusted under 35 U.S.C. 154(b) by 177 days.

(21) Appl. No.: 15/029,264

(22) PCT Filed: Nov. 7, 2014

(86) PCT No.: PCT/EP2014/074044
§ 371 (c)(1),
(2) Date: Apr. 14, 2016

(87) PCT Pub. No.: WO2015/067756
PCT Pub. Date: May 14, 2015

(65) Prior Publication Data
US 2016/0241663 A1  Aug. 18, 2016

(30) Foreign Application Priority Data
Nov. 7, 2013  (DE) .......... 10 2013 018 596

(51) Int. Cl.
*H04L 12/40* (2006.01)
*H04L 12/46* (2006.01)
*H04L 29/08* (2006.01)

(52) U.S. Cl.
CPC ........ *H04L 67/288* (2013.01); *H04L 12/4625* (2013.01); *H04L 12/4641* (2013.01);
(Continued)

(58) Field of Classification Search
CPC .............. H04L 67/288; H04L 12/4641; H04L 12/4625; H04L 67/2861; H04L 67/125
See application file for complete search history.

(56) References Cited

U.S. PATENT DOCUMENTS

| 5,754,548 A | 5/1998 | Hoekstra et al. |
| 2008/0052384 A1* | 2/2008 | Marl .................. H04L 12/2807 709/223 |

(Continued)

FOREIGN PATENT DOCUMENTS

| CN | 102811233 A | 12/2012 |
| DE | 102011080467 A1 | 2/2013 |

(Continued)

OTHER PUBLICATIONS

Authorized Officer : Nora Lindner, English Translation of the "International Preliminary Report on Patentability" issued in counterpart International Patent Application No. PCT/EP2014/074044, dated May 10, 2016, Publisher: PCT, Published in: WO.

(Continued)

*Primary Examiner* — Michael A Keller
*Assistant Examiner* — Austin J Moreau
(74) *Attorney, Agent, or Firm* — Kaplan Breyer Schwarz, LLP

(57) ABSTRACT

A network system having a first network infrastructure comprising at least one network participant and at least one coupling unit via which the first network infrastructure is connected to a cloud computing infrastructure having at least one cloud computing-based application. The coupling unit is equipped and designed to emulate at least one additional network participant for the first network infrastructure by interacting with the cloud computing-based application, wherein data can be transmitted between the
(Continued)

first network participant and the additional network participant of the first network infrastructure.

18 Claims, 6 Drawing Sheets

(52) U.S. Cl.
CPC ........ H04L 67/125 (2013.01); H04L 67/2861 (2013.01); *H04L 2012/4026* (2013.01)

(56) References Cited

U.S. PATENT DOCUMENTS

| | | | | |
|---|---|---|---|---|
| 2009/0132060 | A1* | 5/2009 | Jenks | G05B 17/02 700/7 |
| 2011/0053558 | A1* | 3/2011 | Teague | H04L 9/3273 455/411 |
| 2012/0102240 | A1* | 4/2012 | Wei | H04L 12/403 710/30 |
| 2013/0086245 | A1 | 4/2013 | Lu et al. | |
| 2013/0101071 | A1* | 4/2013 | Salinger | H04N 19/80 375/320 |
| 2014/0336785 | A1* | 11/2014 | Asenjo | G05B 19/4185 700/17 |

FOREIGN PATENT DOCUMENTS

| | | |
|---|---|---|
| DE | 102011053757 A1 | 3/2013 |
| DE | 102011055657 A1 | 5/2013 |
| DE | 102011056524 A1 | 6/2013 |
| EP | 1852758 A2 | 11/2007 |
| EP | 2206025 A1 | 7/2010 |
| EP | 2343658 A1 | 7/2011 |
| EP | 2484061 A1 | 8/2012 |
| EP | 2528302 A1 | 11/2012 |
| EP | 2567297 A1 | 3/2013 |
| EP | 2580628 A1 | 4/2013 |
| EP | 2584415 A1 | 4/2013 |
| EP | 2605096 A1 | 6/2013 |
| EP | 2608451 A1 | 6/2013 |
| WO | 2011/138375 A1 | 11/2011 |
| WO | 2011/154211 A1 | 12/2011 |
| WO | 2011/156261 A1 | 12/2011 |

OTHER PUBLICATIONS

"German Search Report", dated Jun. 27, 2014, issued in counterpart German Patent Application No. 102013018596.3, Published in: DE.

"International Search Report", dated Feb. 16, 2015, issued in counterpart International Patent Application No. PCT/EP2014/07044, Published in: PCT.

"International Written Opinion", issued in counterpart International Patent Application No. PCT/EP2014/074044, Published in: PCT.

* cited by examiner

NETWORK SYSTEM, COUPLING UNIT, AND METHOD FOR OPERATING A NETWORK SYSTEM

FIELD OF THE INVENTION

The invention relates to a network system that has a first network infrastructure comprising at least one first network participant that is configured as a control device and at least one coupling unit via which the first network infrastructure is connected to a cloud computing infrastructure having at least one cloud computing-based application. The invention further relates to a coupling unit and a method for operating a network system.

BACKGROUND OF THE INVENTION

The "network system" is, for example, an automation network system. For some time, there has been a noteworthy trend here in that conventional fieldbus systems are increasingly being replaced or supplemented by Ethernet-based systems such as, for example, PROFINET or EtherCat. Ethernet-based systems—which, like conventional fieldbus systems, can also be configured for real time-capable data transmission—enable a uniform network structure of the process control level, up to the field devices in industrial production installations. This trend is known as vertical integration of automation technology; in Ethernet-based network systems of automation technology, there is generally also discussion of industrial Ethernet. In automation network systems, there is cyclic or even acyclic transmission of, in particular processing and diagnostic data and any applicable additional data between the network participants, examples of which may be field devices and controllers.

The network infrastructure of an automation network system, in particular a fieldbus, is generally geographically limited, i.e., locally limited to, for example, a production site. Only rarely is it possible for the network infrastructure of an automation network system to extend beyond a production site. Often, a so-called virtual private network (VPN) is set up in order to connect two or more network infrastructures or sub-networks at different production sites, and thus to form a multi-site network system. The sub-networks of the individual sites (local area networks (LANs)) are then connected over a VPN gateway to a wide area network such as, for example, the Internet, wherein a data link, also called a VPN tunnel, which is secured by encryption mechanisms is constructed between the VPN gateways.

Within a sub-network, the network participants communicate in accordance with at least one shared communication protocol. Even if the same communication protocol is provided in the sub-networks of two sites, data transmission between the two sub-networks via the VPN tunnel often takes place in accordance with a so-called telecontrol protocol. With automation network systems, the telecontrol protocol must be set up in at least one controller of the respective sub-network, so that data can be transmitted between the controllers of different sub-networks via the VPN tunnel in accordance with the telecontrol protocol.

However, a considerable amount of administrative and configurational effort must be put into implementing a network system having sub-networks configured in at least two separate sites in accordance with the aforementioned conventional approach.

First, it is necessary for the respective network infrastructure to be set up with the network participants thereof at each of the sites; in particular, the respective controller must be configured and put into operation. Then, the network infrastructure of each site must be connected to a wide area network such as, for example, the Internet. In the controllers of the network infrastructures connected via the wide area network, a telecontrol protocol must be set up, in accordance with which the controllers are to transmit data to one another via the wide area network. Because a telecontrol protocol only rarely allows for encrypted data transmission, a VPN tunnel must also be set up. Even if the telecontrol protocol already provides encryption mechanisms, problems can arise with respect to addressing. The addresses of the participants must be known, both in order to set up the telecontrol protocol and in order to set up the VPN tunnel. In wide area networks such as the Internet, the operator or provider confers mostly dynamic addresses, in particular public IP addresses to the network participants of the wide area network, such that the address of a network participant changes over the course of time. The telecontrol protocol or the VPN tunnel can then be set up on the basis of the name of the respective participant, wherein a service for a dynamic domain name system (DNS) must additionally be set up, with corresponding additional expenditure, the respective currently-valid address being assigned by means thereof to the name of the respective participant. Another possible problem is the fact that due to performance reasons, a VPN tunnel can often only handle a relatively small number of connections, for example, ten connections. Moreover, though the telecontrol protocol does make it possible to transfer data between the controllers at the different sites, the network infrastructure of one site is not thereby expanded through the network infrastructure of the other site in such a manner that the network participants of the one network infrastructure could exchange data with the network participants of the other network infrastructure in the same manner as can be done with participants of the same network infrastructure. This complicates the engineering of automation processes beyond the limits of the network infrastructure of one site. It also bears mentioning that the wide area network, as a connection between the local network infrastructures, also poses a risk in that if there is a disconnect or connection failure, the entire automation process will be stopped, because parts of the network system—i.e., the separate sub-network and the network participants thereof—would no longer be available. With a PROFINET-based network system, for example, a so-called watchdog timer would be triggered if specific data is not available within a protocol-specifically defined period of time, or at a protocol-specifically defined point in time.

Another trend observed in network systems in general and in automation network systems in particular is the coupling of network infrastructures with cloud computer infrastructures, involving abstracted IT infrastructures that are dynamically adaptable to the respective requirements and that supply, for example, computing capacity, storage capacity, or network capacity, as well as software applications for the network participants of the network infrastructure coupled to the cloud computing infrastructure. The cloud computing infrastructure is then operated, for example, by a service provider, and is connected to the local network infrastructure via a WAN such as the Internet.

DE 10 2011 053 757 A1, for example, discloses a method for generating and handling component applications for physical components of a control system, such as, for example, a programmable control unit. The aforementioned method provides that the component applications are generated so as to be distributed in a cloud-based environment, wherein each of the component applications is generated in a representative representing the physical components in the cloud-based environment, through interaction between the representatives as well as between the representatives and the associated physical components. The interaction between the representatives and between the representatives and the associated physical components is then controlled by service-level agreements (SLAB). The generated component applications can be distributed to the other components of the control system by means of the physical components, in the form of the control unit, with consideration given to the SLAB.

Similarly, EP 2 580 628 A1 discloses a method for integrating at least one field device into an automation network. Therein, the field devices are accessed via a field access unit that communicates with at least one automation integration platform at least one web server of a service provider, wherein a virtual version of the field device is provided in a database by the service provider for each of the field devices. The virtual version of the field device, with the precise field device-specific and application-specific properties, can thereby be transmitted at runtime either automatically or on request by the service provider to the operator of the automation installation, via cloud computing web services or Internet-based services, and immediately transferred into the field device so that the field device performs its function in the automation installation immediately upon being integrated into the network.

In addition, EP 2 605 096 A1 also discloses a safety-oriented controller in combination with cloud computing. This control device cyclically accepts safety-oriented input signals from an industrial technical process in a failsafe manner, and transmits the input signals to a computer cluster via a connection to a computer network, with the use of a failsafe protocol. The controller then accepts certain safety-oriented control signals from the computer cluster for the industrial technical process, and decides on the basis of additional information in a failsafe manner whether it recognizes as correct the control signals identified by the computer cluster.

Depending on the outcome of the decision, the controller controls the industrial technical process in accordance with the safety-oriented control signals in a failsafe manner, or transfers the industrial technical process into a secure state in a failsafe manner.

Moreover, EP 2 484 061 B1 also discloses a scalable, cloud computing-based architecture for extending a private enterprise network infrastructure, wherein resources can be seamlessly integrated through the setting up of, inter alia, a logical customer edge router in a cloud data center in the cloud topology.

EP 2 528 302 A1 additionally discloses a cloud-enabled virtual gateway that can masquerade, to an application within the cloud environment, as a physical gateway that is installed at a geographic location. The virtual gateway can receive a request from the cloud-based application for a device at the geographic location to which it is connected via a communication system.

SUMMARY OF THE INVENTION

Against this background, the present invention addresses in particular the problem of providing the ability to easily integrate an additional network participant into a network infrastructure of a network system having at least one first network participant, the additional network participant not being physically located at the local site of the first network infrastructure but being located, in particular, in another, separate network infrastructure.

These subject matters according to the invention offer many advantages. An essential aspect of the invention lies in particular in the use of cloud computing technologies.

The network system according to the invention comprises a first network infrastructure having at least one first network participant that is configured as a control device, a cloud computing infrastructure having at least one cloud computing-based application, and a coupling unit having a first interface and a second interface. Therein, the coupling unit is connected by means of the first interface to the first network infrastructure, and by means of the second interface to the cloud computing infrastructure. In addition, the coupling unit is equipped and designed to emulate at least one additional network participant for the first network infrastructure by interacting with the cloud computing-based application, wherein data can be transmitted between the at least first network participant and the additional network participant of the first network infrastructure. A significant advantage here is that to the at least first network participant of the first network infrastructure, the emulated additional network participant appears to be a network participant of the same network infrastructure. In particular, thanks to the emulation enabled by the coupling unit, the additional network participant physically not located at the local site of the first network infrastructure can be integrated into the first network infrastructure without prior setup of the above-mentioned means, such as a telecontrol protocol, VPN tunnel, or dynamic DNS, thus greatly reducing the expenditure for configuration, administration, and maintenance.

According to another aspect of the invention, the first network infrastructure is preferably a fieldbus, in particular, an Ethernet-based fieldbus.

According to another aspect of the invention, the first network infrastructure preferably comprises at least one second network participant, which is configured as a field device, in particular, as a sensor or actuator. The network system is thus advantageously designed and adapted for use in automation technology, and is subsequently also designated as an automation system.

According to another aspect of the invention, the coupling unit is a unit within the control device; the coupling unit may, however, also be implemented as a separate unit, and thus be a second or third network participant of the first network infrastructure, wherein—in the latter case—the emulated additional network participant is a third or fourth network participant of the first network infrastructure. Preferably, the coupling unit is configured in hardware and/or software, and particularly preferably as a so-called embedded device. In particular, if the coupling unit is configured as a unit within the control device, then the unit may be implemented essentially as software, thus making it possible to save on hardware costs.

According to another aspect of the invention, data may be and preferably is transmitted according to a shared first communication protocol within the first network infrastructure, between all of the network participants of the first network infrastructure, in particular also including the additional emulated network participant. As regards the communication protocol for data transmission within the first network infrastructure, advantageously there are no changes or adjustments required in order to enable data transmission, even with the additional emulated network participant.

According to another aspect of the invention, the coupling unit is connected by means of the second interface to the cloud computing infrastructure via an intermediary second network infrastructure, wherein the second network infrastructure may entail a wide area network, and in particular the Internet. Then, data can be transmitted within the second network infrastructure in accordance with a second communication protocol, which may be different from the first communication protocol.

According to another aspect of the invention, the cloud computing infrastructure is additionally connected to a third network infrastructure, wherein the cloud computing-based application further interacts with at least one network participant of the third network infrastructure, which entails, in particular, a field device, a control device, or a database server of the third network infrastructure. Preferably, then, the network participant of the third network infrastructure or at least one specific service and/or at least one specific function of the network participant of the third network infrastructure is represented by the emulated additional network participant in the first network infrastructure. This is advantageous in that for the at least first network participant or, in an advantageous development, for each additional network participant of the first infrastructure, it is essentially unrecognizable or indistinguishable that it is actually exchanging data with a merely represented network participant that is physically not located at the local site of the first network infrastructure.

According to another aspect of the invention, the cloud computing-based application is advantageously designed and adapted to provide a user interface for setting up the at least one coupling unit. This user interface may be presented to an operator, for example, within a web browser environment on an operating terminal connected to the cloud computing infrastructure. For example, a PC, a tablet computer, or a smart phone may be used as the operating terminal.

The coupling unit for a network system according to the invention comprises a first interface and a second interface, wherein the coupling unit can be connected by means of the first interface to a first network infrastructure, and can be connected by means of the second interface to a cloud computing infrastructure. In addition, the coupling unit is equipped and designed to emulate at least one network participant for the first network infrastructure, in interaction with a cloud computing-based application of the cloud computing infrastructure.

There is a significant advantage in that thanks to the emulation enabled by the coupling unit, the additional network participant—which is not physically located at the local site of the first network infrastructure—can be easily integrated into the first network infrastructure. This is subsequently also possible if, then, the first network infrastructure already exists or has existed and is to be expanded or supplemented as a part of an upgrade because of an additional network participant not physically located at the local site of the first network infrastructure.

According to another aspect of the invention, identification information about the coupling unit and identification information about the cloud computing infrastructure are stored in the coupling unit. In particular, in this regard, a memory area of the coupling unit stores or saves a so-called user identifier, unit identifier, or unique identifier (UID) of the coupling unit—for example, a media access control (MAC) address thereof—and a UID of the clouding computing infrastructure—for example, the MAC address, the IP address, or the name of a server of the cloud computing infrastructure. The coupling unit is thereby advantageously already pre-configured for a connection to a predetermined cloud computing infrastructure. The provider of such a cloud computing infrastructure can then, for example, provide its customers with coupling units that are pre-configured for the cloud computing structure thereof, thus reducing or simplifying the effort of installation for the customer.

According to another aspect of the invention, the coupling unit is equipped and designed to detect the presence of a connection to the second interface and—upon detection of the presence of a connection to the second interface—to initiate data transmission with the cloud computing infrastructure, with the use of the identification information of the coupling unit and the identification information of the cloud computing infrastructure. The effort of installation is thereby further reduced, because the coupling unit automatically attempts to contact the cloud computing infrastructure.

According to another aspect of the invention, the coupling unit stores security information, and the coupling unit is equipped and designed to initiate secure data transmission, in particular, encrypted data transmission, to the cloud computing infrastructure with the use of the security information. This makes it possible to significantly increase the security of data transmission. In particular, in this regard, a memory area of the coupling unit stores or saves a so-called security certificate. This security certificate may, for example, have been issued from the provider of the cloud computing infrastructure. On the one hand, this security certificate enables the coupling unit to authenticate itself to the cloud computing infrastructure, and thus prove that it is approved for data transmission to the cloud computing infrastructure. On the other hand, this security certificate can serve as the basis for encrypted data transmission between the coupling unit and the cloud computing infrastructure. Transport layer security (TLS) is one example that may be provided as an encryption mechanism.

According to another aspect of the invention, the coupling unit provides a confirmation element that can be activated in order to confirm a data transmission initiated from the cloud computing infrastructure in the presence of a connection to the second interface. This makes it possible to significantly increase security, because additional data transmission between the coupling unit and the cloud computing infrastructure can take place only after activation of the confirmation element. The confirmation element may be implemented in hardware and/or software.

According to another aspect of the invention, the coupling unit may be configured either as a unit within a first network participant, configured as a control device, of the first network infrastructure, or as a separate unit, and—in the latter case—may constitute at least one second network participant for the first network infrastructure. Preferably, the coupling unit is configured in hardware and/or software, and particularly preferably as a so-called embedded device. In particular if the coupling unit is configured as a unit within the control device, then the unit may be implemented essentially as software, thus making it possible to save on hardware costs.

The method according to the invention for operating a network system comprising a first network infrastructure having at least one first network participant comprises the following steps:

providing a coupling unit according to the invention, which comprises a first interface and a second interface;

connecting the first interface of the coupling unit to the first network infrastructure;

connecting the second interface of the coupling unit to a cloud computing infrastructure having at least one cloud computing-based application;

emulating an additional network participant for the first network infrastructure, through the coupling unit, in interaction with the cloud computing-based application; and transmitting data between the at least first network participant and the additional network participant.

A significant advantage that can be achieved with this method is that to the at least first network participant of the first network infrastructure, the emulated additional network participant appears to be a network participant of the same network infrastructure. In particular, thanks to the emulation enabled by the coupling unit, the additional network participant physically not located at the local site of the first network infrastructure can be integrated into the first network infrastructure without prior setup of the above-mentioned means, such as a telecontrol protocol, VPN tunnel, or dynamic DNS, thus greatly reducing the expenditure for configuration, administration, and maintenance.

According to another aspect of the invention, in the method, data is transmitted according to a shared first communication protocol within the first network infrastructure, between all of the network participants of the first network infrastructure, in particular also including the additional emulated network participant. As regards the communication protocol for data transmission within the first network infrastructure, advantageously there are no changes or adjustments required in order to enable data transmission, even with the additional emulated network participant.

In particular, for the engineering of automation processes beyond the limits of the network infrastructure of a site, a significant simplification is imparted by invention, in particular the network system according to the invention as well as the coupling unit and the method for operating a network system.

BRIEF DESCRIPTION OF THE DRAWINGS

This and additional features and advantages will be made more readily apparent by the following description of embodiments, in conjunction with the accompanying drawings.

DETAILED DESCRIPTION

Figure 1:
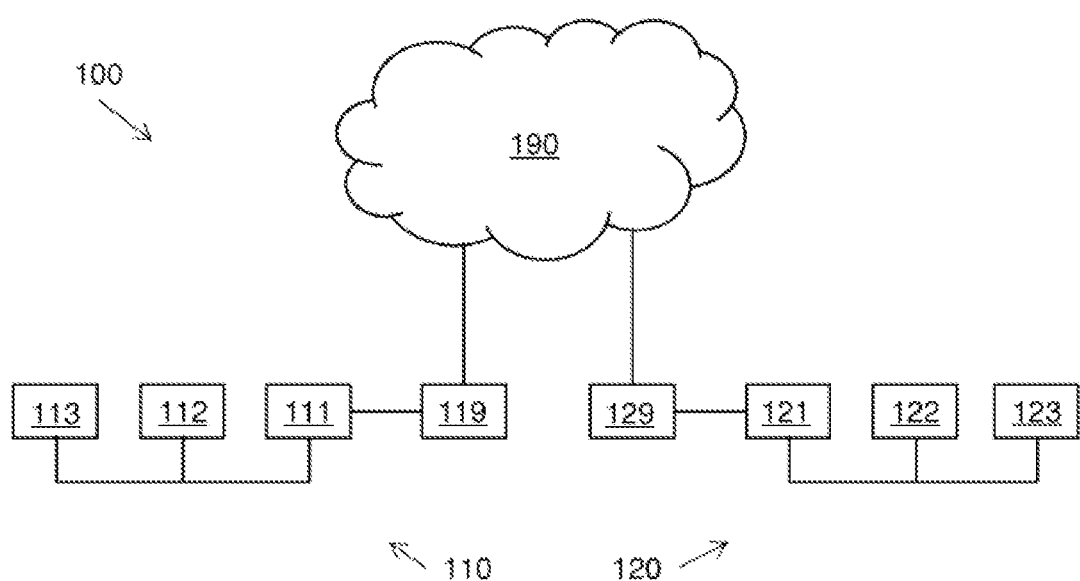
FIG. 1 illustrates a schematic representation of a network system according to the prior art.

FIG. 1 illustrates a schematic representation of a network system 100 according to the prior art, by way of example. The network system 100 comprises a network infrastructure 110 installed at a first site, and a network infrastructure 120 installed at a second site that is geographically remote from the first site.

The network infrastructure 110 comprises, as network participants, a control device 111 and, for example, two field devices 112 and 113 of an automated industrial process, which are herein connected to one another via an Ethernet-based bus, for example, a PROFINET-based bus, and transmit process data, diagnostic data, and other data to one another via the bus.

Similarly, the network infrastructure 120 comprises, as network participants, a control device 121 and two field devices 122 and 123 of an automated industrial process, which are herein connected to one another, for example, also via a PROFINET-based bus, and transmit process data, diagnostic data, and other data to one another via the bus.

So that data can also be transmitted between sites and can be used in the network infrastructure at the respective other site, the network infrastructure 110 and the network infrastructure 120 are each linked to the network infrastructure 190, which is configured as a wide area network and is herein, for example, the Internet—and are thereby linked to one another—by means of a VPN gateway device 119 and a VPN gateway device 129, respectively. As described above, the two VPN gateway devices 119 and 129 serve to provide a protected communication channel, called a VPN tunnel, between the network infrastructures of the two sites, so that data can be transmitted in a secure and, in particular, encrypted manner over the wide area network, which is itself insecure.

The network infrastructures 110 and 120 thus do form sub-networks of the network system 100, in a sense. However, the network participants of the network infrastructure 110 are not able to exchange data directly with the network participants of the network infrastructure 120 over the communication channel of the VPN tunnel. Rather, data exchange takes place only between the control devices 111 and 121, namely, according to a special so-called telecontrol protocol, for example, according to the IEC 60870 Standard, which has been set up for this purpose on the control devices 111 and 121. Thus, for example, the control device 111 communicates with the field devices 112 and 113 of the local network infrastructure 110 thereof in accordance with a PROFINET-specific protocol, but communicates with the control device 121 of the separate network infrastructure 120 in accordance with the telecontrol protocol. Therefore, the coupling of the sub-networks is not transparent, in the sense of network topology.

As previously described, the effort as regards setup, administration, and configuration is also very high with this conventional approach to putting a network system into service with sub-networks that are configured in at least two sites that are separate from one another.

It also bears mentioning that the wide area network 190, as a connection between the local network infrastructures 110 and 120, also poses a risk in that if there is a disconnect or connection failure, the entire automation process will be stopped, because parts of the network system—i.e., the separate sub-network and the network participants thereof—would no longer be available. With a PROFINET-based network system, for example, a so-called watchdog timer would be triggered if specific data is not available within a protocol-specifically defined period of time, or at a protocol-specifically defined point in time.

Figure 2:
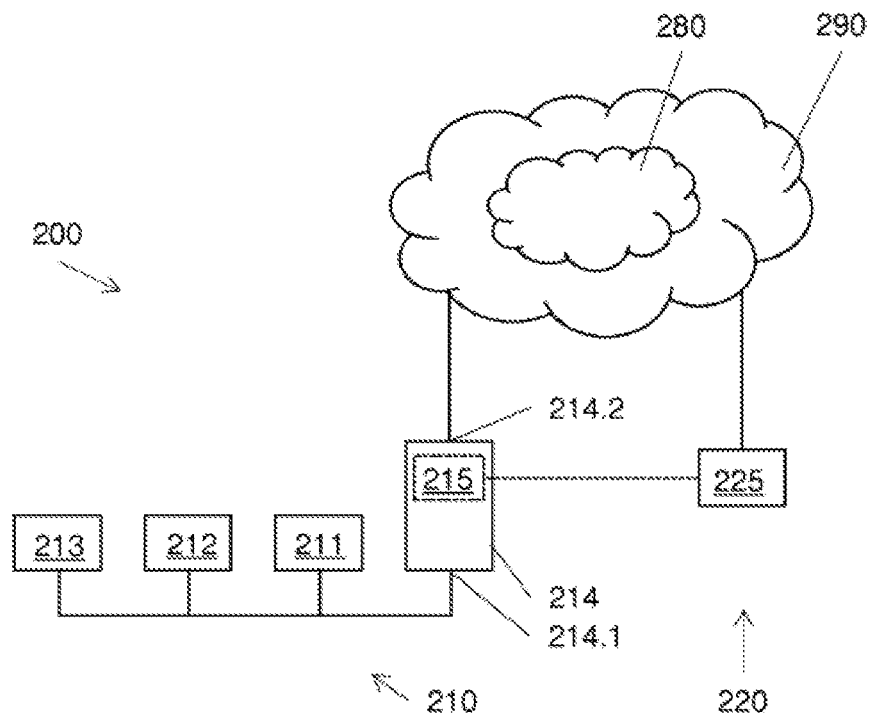
FIG. 2 illustrates a schematic representation of a network system in an embodiment according to the invention, wherein the coupling unit is configured as a separate unit, and emulates an additional network participant.

FIG. 2 illustrates a schematic representation of a network system 200 in an embodiment according to the invention, by way of example.

The network system 200 comprises a network infrastructure 210, which is installed at a first site and comprises a control device 211 as a first network participant as well as, preferably, two field devices 212 and 213 of an automated industrial process as second network participants, which are herein connected to one another via a PROFINET-based bus and transmit process data, diagnostic data, and other data to one another via this bus. The network system 200 is thus advantageously designed and adapted for use in automation technology, and may therefore also be designated as an automation system.

Also provided is a coupling unit 214, which here is configured as a separate unit. The coupling unit 214 is connected with a first interface 214.1 thereof to the network infrastructure 210, and, in particular, to the bus of the network infrastructure 210. Via a second interface 214.2 thereof, the coupling unit 214 is connected to a cloud computing infrastructure 280. Cloud computing infrastructures are known from the prior art, as already discussed above. The cloud computing infrastructure 280 is linked to the wide area network 290 in this example. The coupling unit 214 is also linked with the second interface 214.2 thereof to the wide area network 290, and is thus also connected to the cloud computing infrastructure 280.

At a second site, which is geographically remote from the first site, an additional network infrastructure 220 is installed, with FIG. 2 only illustrating one network participant 225 thereof, which may entail a field device or a controller for an automated industrial process. This network participant 225 is also linked to the wide area network 290, and is thus also connected to the cloud computing infrastructure 280.

According to the invention, the following is provided in order for the network participant 225 of the separate network infrastructure 220 to now be integrated into the network infrastructure 210 so as to enable data transmission between the network participants of the network infrastructure 210 and the network participant 225 of the network infrastructure 220. At least one cloud computing-based application, which is not depicted in further detail in the drawings, is provided and executed by the cloud computing infrastructure 280. Both the coupling unit 214 and the network participant 225 are disclosed to this cloud computing-based application, or are registered with this application. Allocation of the network participant 225 to the coupling unit 214 can also be produced by means of this application. Further details with respect to such a cloud computing-based application that is possible shall be discussed later, in particular, in connection with FIGS. 6 to 8. In any case, the coupling unit 214 is configured in order to emulate the network participant 225 in the interaction with the cloud computing-based application, and thus to integrate same into the network infrastructure 210 as an emulated additional network participant 215. To emulate the network participant 225 as the network participant 215, the coupling unit 214 makes appropriate use of device description data about the network participant 225, which is made available thereto via the cloud computing-based application, for example, as general station description (GSD) data in the XML-based GSD markup language (GSDML) format. The additional network participant 215 emulated by the coupling unit 214 represents—so to speak—the network participant 225 of the remote network infrastructure 220 within the network infrastructure 210. Data (process data, diagnostic data, alarming, and so forth) can now be transmitted between the network participants 211, 212, 213 and the emulated additional network participant 215, namely, advantageously, without the need for this data to first be exchanged between the network participants 215 and 225 for this purpose. Thus, the network participant 215 is also able to independently perform processing and/or (re)transmission of input and/or output data appropriately in accordance with specific device description data, e.g., also on the basis of data received from the network participants 211, 212, 213.

The coupling unit 214, however, also suitably ensures that output data of the network participant 225 is also forwarded to the network participant 215, and is then available as output data thereof in the network infrastructure 210. Conversely, the coupling unit 214 also suitably ensures that input data for the network participant 215 is also forwarded to the network participant 225. This logical connection between the network participant 225 and the emulated network participant 215 is depicted in FIG. 2 as a dashed line. Thus, current input data for the network participant 215 is also available, with a time offset, to the network participant 225, and current output data of the network participant 225 is also available, with a time offset, to the network participant 215.

However, because even the emulated network participant 215 is suitably capable of performing independent data processing and/or transmission within the network infrastructure 210, without the need for data to first be exchanged between the network participants 215 and 225 for this purpose, a validity of the data processed and/or transmitted within the network infrastructure 210 is essentially decoupled from the data updating between the network participants 215 and 225, and an automation process may continue even if the data link to the remote network participants is disturbed. The network participant 215 emulated by the coupling unit thus properly executes the independent data processing and/or data transmission always on the basis of the most recently available data.

However, when necessary, it is also possible to take measures to recognize the existence of outdated data and trigger appropriate security responses.

If the coupling unit 214 emulates a network participant, this means that the coupling unit mimics the network participant in particular with respect to the properties, function, and/or behavior thereof, and thereby effectively imitates the network participant. The emulated network participant appears to be as though original to the other network participants, and is also treated accordingly thereby.

There is therefore a substantial advantage in that the emulated additional network participant 215, as representative of the network participant 225, appears to the network participant of the first network infrastructure 210 as though a network participant of the same network infrastructure, i.e., it is unrecognizable or indistinguishable for the network participant of the network infrastructure 210 that it is actually exchanging data with a network participant that is not physically located at the local site of the network infrastructure 210. In particular, thanks to the emulation enabled by the coupling unit, the additional network participant physically not located at the local site of the first network infrastructure can be integrated into the first network infrastructure without prior setup of the above-mentioned means, such as a telecontrol protocol, VPN tunnel, or dynamic DNS, thus greatly reducing the expenditure for configuration, administration, and maintenance.

This is achieved, in particular, by the preferable storage of at least one piece of identification information about the coupling unit and at least one piece of identification information about the cloud computing infrastructure 290 in the coupling unit 214. In particular, in this regard, a memory area of the coupling unit 214 stores or saves a so-called user identifier, unit identifier, or unique identifier (UID) of the coupling unit—for example, a media access control (MAC) address thereof—and a UID of the clouding computing infrastructure—for example, the MAC address, the IP address, or the name of a server of the cloud computing infrastructure. The coupling unit 214 is thus already preconfigured to connect or establish a connection with a predetermined cloud computing infrastructure, which here is the cloud computing infrastructure 280. Moreover, the coupling unit 214 is equipped and designed to detect the presence of a connection to the second interface 214.2 and—upon detection of the presence of a connection to the second interface 214.2—to initiate data transmission with the cloud computing infrastructure 280, with the use of the identification information of the coupling unit and the identification information of the cloud computing infrastructure, in particular automatically or autonomously.

Particularly preferably, the coupling unit 214 stores security information, and the coupling unit 214 is equipped and designed to initiate secure data transmission, in particular, encrypted data transmission, to the cloud computing infrastructure 280 with the use of the security information. In particular, in this regard, a memory area of the coupling unit 214 stores or saves a so-called security certificate. This security certificate may, for example, have been issued from the provider or operator of the cloud computing infrastructure 280. On one hand, this security certificate enables the coupling unit 214 to authenticate itself to the cloud computing infrastructure 280, and thus prove that it is approved for data transmission to the cloud computing infrastructure 280. On the other hand, this security certificate can serve as the basis for encrypted data transmission between the coupling unit and the cloud computing infrastructure. Here, in particular, transport layer security (TLS) is provided as an encryption mechanism.

The data transmission between the coupling unit 214 and the cloud computing infrastructure 280 or the cloud computing-based application executed within the cloud computing infrastructure 280, via the wide area network 290, which here is the Internet, takes place in accordance with protocols and mechanisms that are typical for the Internet, such as TCP/IP and HTTP or HTTPS, if the encryption mechanism TLS is being used. The cloud computing-based application is set up here advantageously as a web service having at least one defined web service interface for machine-to-machine communication, in particular with the coupling unit 214. Additional—in particular, XML-based—protocols and mechanisms that are set up on HTTP or HTTPS in the protocol stack are used for web service-related data transmission, examples being web services description language (WSDL), simple object access protocol or service-oriented architecture protocol (SOAP), and/or representational state transfer (REST).

Thus, while data is transmitted in accordance with a shared first communication protocol—which here is a PROFINET-specific protocol—within the network infrastructure 210 between all of the network participants 211, 212, 213, in particular also including the additional emulated network participant 215, the data transmission between the coupling unit 214 and the cloud computing infrastructure 280 takes place in accordance with at least one other communication protocol, which is different from the communication protocol of the network infrastructure 210. The coupling unit is responsible for the suitable protocol conversion; the network participants 211, 212, 213, and 215 remain unaffected thereby. As regards the communication protocol for data transmission within the network infrastructure 210, advantageously there are no changes or adjustments required in order to enable data transmission, even with the emulated network participant 215.

Figure 3:
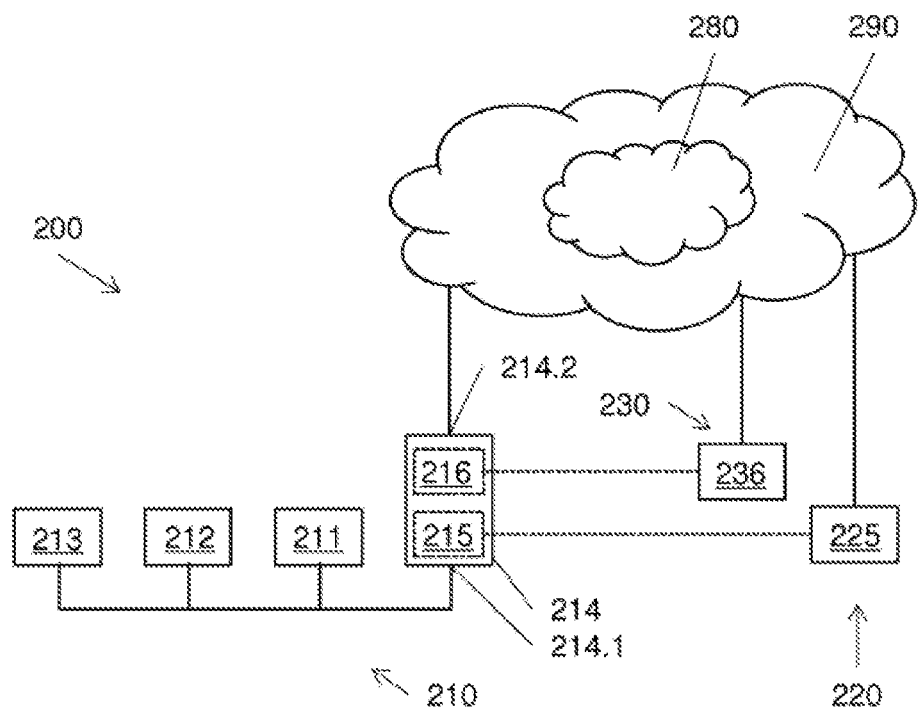
FIG. 3 illustrates a schematic representation of a network system in another embodiment according to the invention, wherein the coupling unit is configured as a separate unit, and emulates two additional network participants.

FIG. 3 illustrates a schematic representation of a network system 200 in another embodiment according to the invention, by way of example.

In contrast to the example according to FIG. 2, the coupling unit 214 in this example emulates two additional network participants for the network infrastructure 210. In addition to the network participant 215, there is also a network participant 216.

The emulated network participant 216 then represents the network participant 236, which belongs to an additional network infrastructure 230 installed at a third site that is also geographically remote from the first site. Of the network infrastructure 230, FIG. 3 only illustrates the network participant 236, which is also linked to the wide area network 290 and thus is also connected to the cloud computing infrastructure 280. The logical connection between the network participant 236 and the emulated network participant 216 is depicted in FIG. 3 as a dashed line. The network participant 236 is emulated as being the network participant 216 through the coupling unit 214, in a manner comparable to what has already been described for the emulation of the network participant 225 as being the network participant 215.

Figure 4:
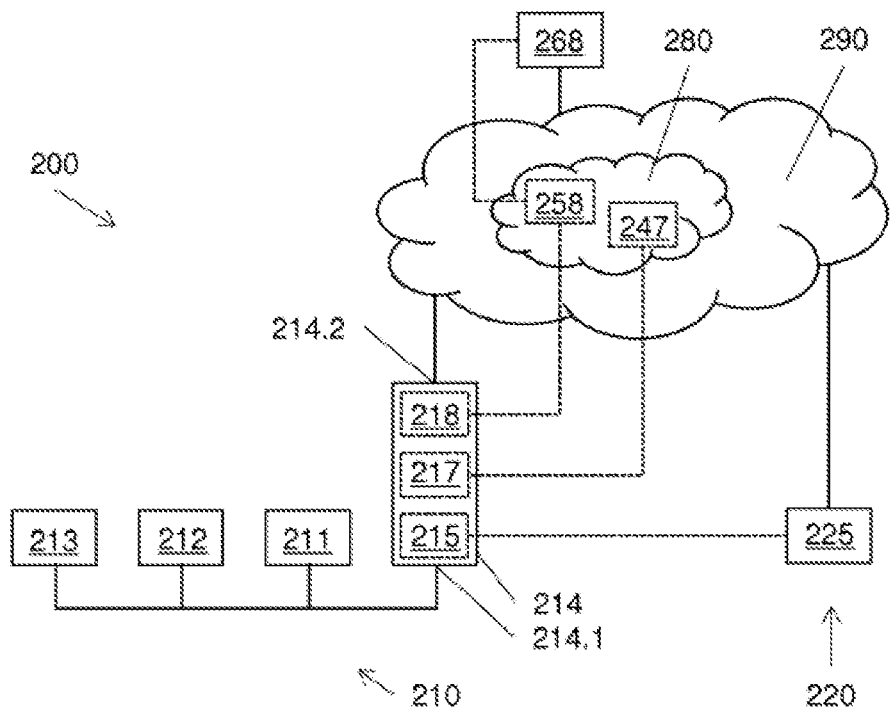
FIG. 4 illustrates a schematic representation of a network system in another embodiment according to the invention, wherein the coupling unit is configured as a separate unit, and emulates three additional network participants.

FIG. 4 illustrates a schematic representation of a network system 200 in another embodiment according to the invention, by way of example.

In contrast to the example according to FIG. 2, the coupling unit 214 in this example emulates three additional network participants for the network infrastructure 210. In addition to the network participant 215, there are also network participants 217 and 218.

The emulated network participant 215 represents the physically extant network participant 225, which, however, is located within the network infrastructure 220, at a geographically remote site.

The emulated network participant 217, in turn, represents in this example a network participant that does not actually physically exist. Rather, the network participant 247 represented by the emulated network participant 217 is purely virtual in nature, and provides, for example, only an interface for receiving and/or sending out data. Therefore, for example, a data storage device, an SQL database, a web application, a web service, a simulator, a computing capacity, or a messaging service for SMS, e-mail, Twitter, or Facebook may be hidden behind the virtual network participant 247, wherein all of this can be located inside or even outside the cloud computing infrastructure 280. If the coupling unit 214, as already stated in relation to FIG. 2, ensures that output data of the network participant 247 is also forwarded to the network participant 217, and then is available as output data thereof in the network infrastructure 210, and also advantageously ensures that input data for the network participant 217 is also forwarded to the network participant 247, then the data—in particular, also including device description data—respectively present at these two network participants 217 and 247 is thereby updated, even if with a time offset.

For example, the virtual network participant 247 may deliver weather data—such as temperatures, sunlight hours, or the position of the Sun, precipitation levels, or wind speeds and directions or weather warnings, which are obtained thereby in the background of a weather data web service. The virtual network participant 247 can then be assigned by means of the cloud computing-based application to the coupling unit 214, so that the coupling unit 214 can then forward this weather data to the other network participants of the network infrastructure 210, as well, via the emulated network participant 217. The emulated network participant 217 then appears to the control device 111 or the field devices 112 and 113 of the automated industrial process as a weather sensor, which has output data used by the controller 111 in order to control the field devices 212 and 213, configured as actuators, in a such a manner that: photovoltaic modules of a solar park are aligned in accordance with position of the Sun and, if there is impending severe weather, are folded into a safe position; the rotor of a wind turbine is braked if wind is too strong; or the household lighting is switched on in use during twilight.

In another example, the virtual network participant 247 may provide access to a data storage device that is located on the hard disk of a web server. The corresponding network participant 217 emulated by the coupling unit 214 would then be available to the other network participants of the network infrastructure 210 as a storage unit, which could then be used, for example, to log E/A data with a theoretically unlimited data volume.

The emulated network participant 218, in turn, represents the network participant 258, which is hybrid in nature, meaning that it is in part virtual in nature, but also in part incorporates data of physically extant network participants, here the network participant 268, which belongs to an additional network infrastructure 260 installed at a fourth site that is also geographically remote from the first site, and which is also linked to the wide area network 290 and thus is also connected to the cloud computing infrastructure 280. For example, on the basis of collected and transmitted sensory data of the network participant 268, configured as a sensor, first calculations are made—in particular, within the cloud computing infrastructure 280, and possibly with the incorporation of additional data provided by the cloud computing infrastructure 280—before the result is available as output data of the network participant 258. The hybrid network participant 258 can be assigned by means of the cloud computing-based application to the coupling unit 214, so that the coupling unit 214 can also forward the output data, containing the calculation result, to the other network participants of the network infrastructure 210, via the emulated network participant 218. Therefore, the hybrid network participant 258 enables cloud computing-based preprocessing of appropriate control values, which can then be forwarded to the control device 111 or the field devices 112 and 113 of the automated industrial process.

The logical connection between the network participant 247 and the emulated network participant 217 and the logical connection between the network participant 258 and 268 and the emulated network participant 218 are depicted in FIG. 4 as a dashed line.

Figure 5:
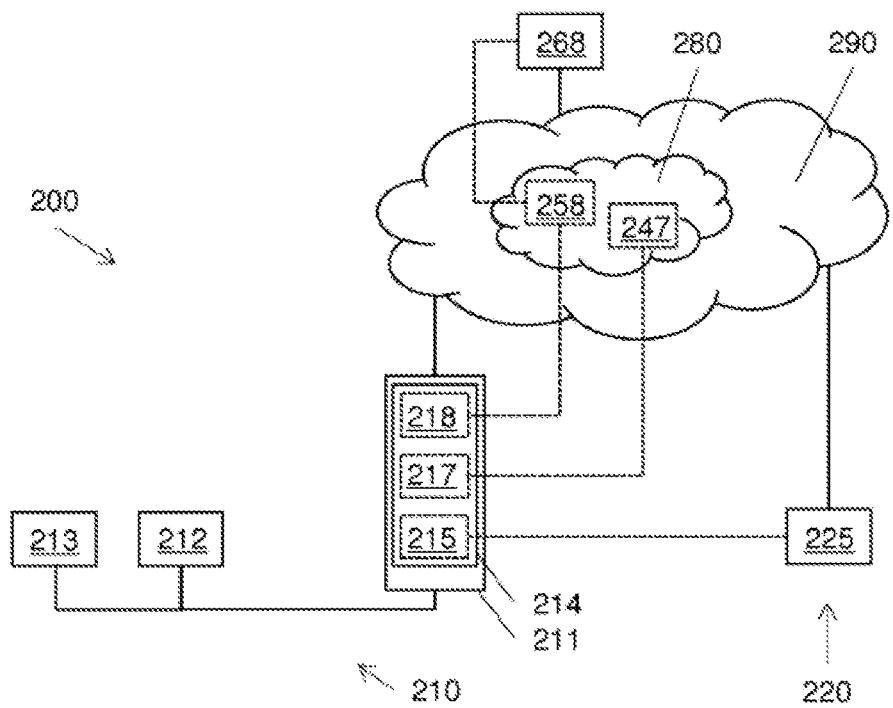
FIG. 5 illustrates a schematic representation of a network system in another embodiment according to the invention, wherein the coupling unit is configured as a unit within the controller, and emulates three additional network participants.

FIG. 5 illustrates a schematic representation of a network system 200 in another embodiment according to the invention, by way of example.

In contrast to the example according to FIG. 4, the coupling unit 214 is configured as a unit within the control device 211, wherein the coupling unit is essentially implemented as a software application that is executed by the control device 211. In this case, thus, in addition to a first interface for the connection to the network infrastructure 210, the control device also has a second interface for the connection to the cloud computing infrastructure 280, wherein both interfaces are available to the coupling unit 214, so that the coupling unit in turn has a first interface and a second interface, in order to connect to the first network infrastructure by means of the first interface and connect to the cloud computing infrastructure by means of the second interface.

The method according to the invention for operating a network system shall now be discussed with reference to the example of the network system 200 depicted in FIG. 3, and with reference to FIGS. 6, 7, and 8, which illustrate, by way of example, schematic depictions of the graphical user interface of the cloud computing-based application interacting with the coupling unit 214, in different stages.

A practical use of the example illustrated in FIG. 3 may appear as follows: A central waterworks (not explicitly shown) has two remote pump stations (also not explicit shown) associated therewith, which each lie several kilometers away. These pump stations provide water to the central waterworks, as necessary.

The network infrastructure 210 is then installed in the central waterworks, and the control device 211 is, for example, an AXC 3050, such as is offered by the applicant. The controller 211 is connected to the network participants 212 and 213 via a bus, in particular, a PROFINET-based bus. The network infrastructures 220 and 230 are installed each in one of the pump stations, wherein the network participants 225 and 236 are configured, for example, as AXC 1050 control devices, as are also offered by the applicant. The system of the central waterworks is thus controlled with the central control device 211, while the pump stations are each controlled by a remote control device 225 or 236. The remote control devices 225, 236 are linked to the wide area network 290, and are connected thereby to the cloud computing infrastructure 280.

The method according to the invention, for example, for operating the network system 200, as illustrated in FIG. 3, in which the network participants 225 and 236, which are physically not located at the local site of the first network infrastructure 210, can be incorporated into the networks comprises now at least the following steps:

providing a coupling unit 214 according to the invention, which comprises a first interface 214.1 and a second interface 214.2;

connecting the first interface 214.1 of the coupling unit 214 to the first network infrastructure 210;

connecting the second interface 214.2 of the coupling unit to a cloud computing infrastructure 280 having at least one cloud computing-based application; The connection here takes place over the wide area network 290.

emulating an additional network participant 215 for the first network infrastructure 210, through the coupling unit 214, in interaction with the cloud computing-based application. Here the coupling unit 214 also emulates a second additional network participant 216. The network participant 215 corresponds here to the network participant 225, and the emulated network participant 216 corresponds to the network participant 236. And transmitting data between the network participant 211 and the additional network participant 215 or 216.

Provided that the coupling unit 214 and the network participants 225 and 236 were already known to the cloud computing-based application and the network participants 225 and 236 were already allocated to the coupling unit 214, substantially no further steps are needed.

For the two control devices 225 and 236 of the remote pump stations, corresponding network participants 215 and 216 are automatically emulated by the coupling unit 214. In the case of the PROFINET-based network structure 210, the emulated network participants 215 and 216 entail so-called IO devices or IO device instances, which all provide PROFINET data and reproduce the state and data of the remote pump stations represented thereby.

The cloud computing-based application is advantageously configured to provide a user interface for setting up a coupling unit. This user interface may be presented to an operator, for example, within a web browser environment on an operating terminal connected to the cloud computing infrastructure. For example, a PC, a tablet computer, or a smart phone may be used as the operating terminal. The setting up of a coupling unit may comprise registering or disclosing a coupling unit with the cloud computing-based application, declaring or disclosing a network participant with the cloud computing-based application, and allocating at least one network participant to a coupling unit. Hereafter, the user interface may vary and provide different control elements depending on the task.

For the purpose of describing the steps for setting up a coupling unit and the user interface of the cloud computing-based application provided therefor, it shall be assumed hereinafter that the coupling unit 214 and the network participant 236 have not yet been registered or disclosed with the cloud computing-based application, but have already been linked to the wide area network 290. Similarly, the network participant 225 shall have already been linked to the wide area network 290.

Before the operator can execute any setup activities at all, he or she must first access the graphical user interface of the cloud computing-based application, for example, in a web browser on an operating terminal, and thereafter authenticate him or herself with a user name and password in order to gain access to the setup functionalities.

Figure 6:
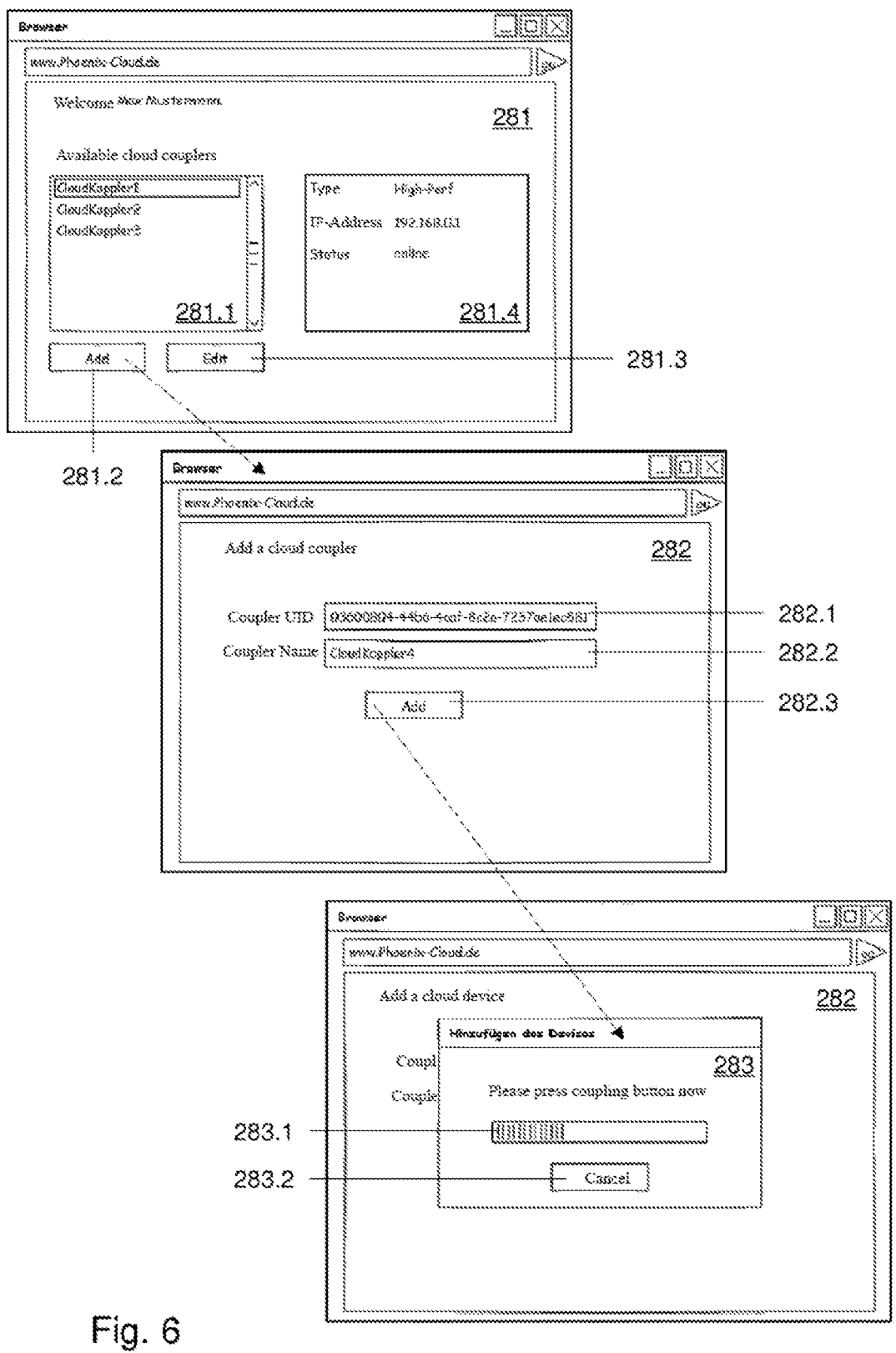
FIG. 6 illustrates a schematic representation of a graphical user interface of a cloud computing-based application interacting with the coupling unit, in various stages during the registration or disclosure of a coupling unit.

FIG. 6 illustrates, by way of example, a schematic representation of a graphical user interface of the cloud computing-based application interacting with the coupling unit 214, in various stages during the registration or disclosure of the coupling unit 214 in the cloud computing-based application. The upper illustration in FIG. 6 shows the user interface in the rendering or view 281. Section 281.1 lists the previously-registered coupling units, under the names "CloudKoppler1" to "CloudKoppler3". The "CloudKoppler1" is currently selected. Section 281.4 displays more information about "CloudKoppler1". By means of the button 281.2 for adding an additional coupling unit, the operator reaches the view 282 shown in the middle illustration in FIG. 6. The operator enters the UID of the coupling unit 214 in the field 282.1, and enters a name for the coupling unit 214—which here is "CloudKoppler4"—in the field 282.2. By means of the button 282.3, the operator starts the registration process for the coupling unit 214, and first reaches the view 283 shown in the lower illustration in FIG. 6. In the background, the cloud computing-based application makes contact with the coupling unit 214, on the basis of the entered UID. The operator must now activate a confirmation element configured on the coupling unit 214, for security reasons, in order to confirm the registration process. The progress bar 283.1 informs the operator of the progress of the registration process. By means of the button 283.2, the operator could also cancel the registration process.

Figure 7:
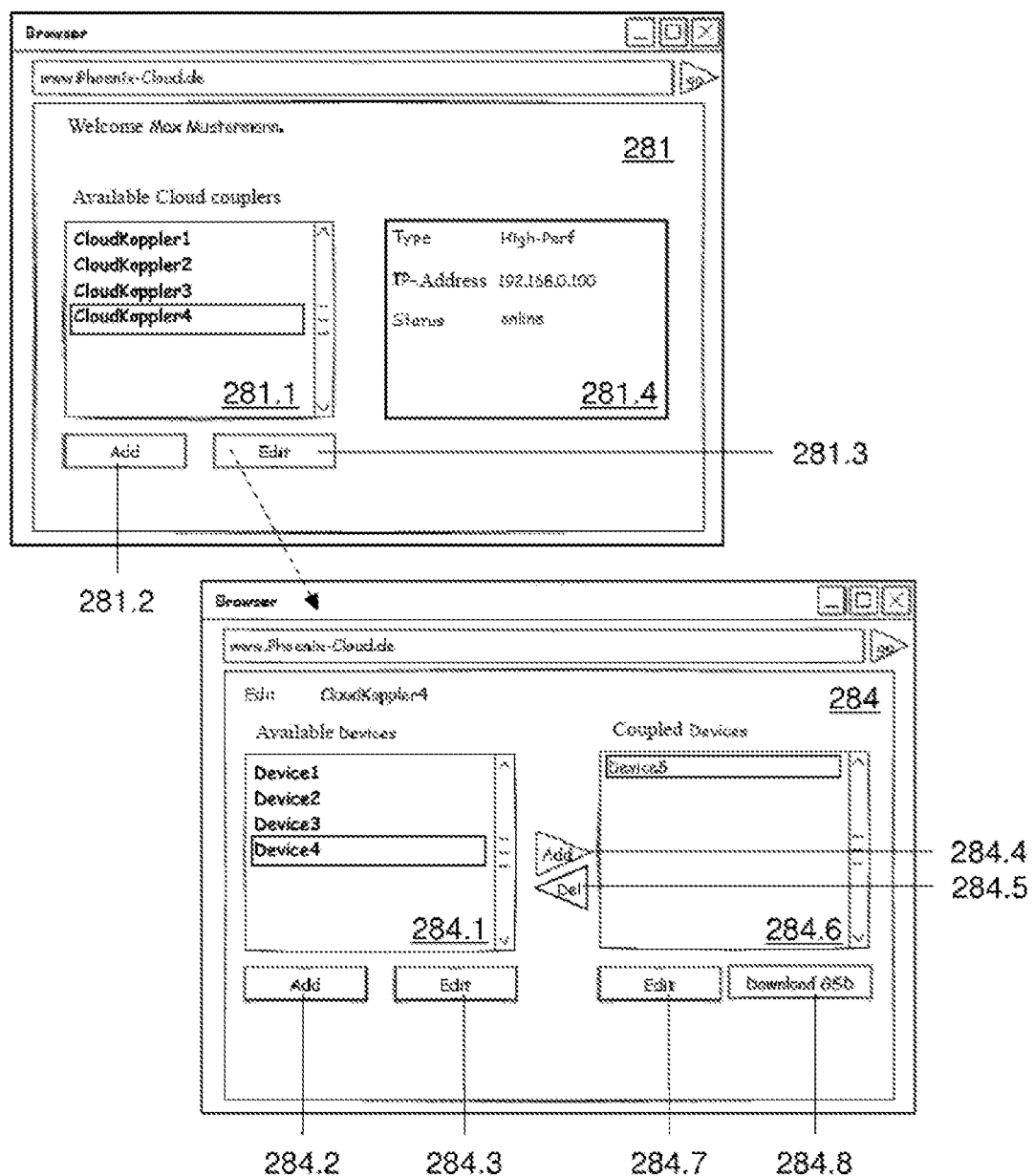
FIG. 7 illustrates a schematic representation of a graphical user interface of a cloud computing-based application interacting with the coupling unit, in various stages during allocation of a network participant to be emulated through the coupling unit.

FIG. 7 illustrates, by way of example, a schematic representation of a graphical user interface of a cloud computing-based application interacting with the coupling unit 214, in various stages during allocation of the network participants 225 and 236 to be emulated through the coupling unit 214.

The upper illustration in FIG. 7 shows again the user interface in the rendering or view 281. The section 281.1 now also lists the coupling unit 214, with the name "CloudKoppler4". The "CloudKoppler4" is also currently selected. Section 281.4 therefore displays more information about "CloudKoppler4". By means of the button 281.3 for editing the settings of the "CloudKoppler4", the operator arrives at the view 284 shown in the lower illustration in FIG. 7. Section 284.1 lists the network participants already registered with the cloud computing-based application, under the names "Device1" to "Device4", which could be allocated to the coupling unit 214. In the section 284.6, there appears a network participant under the name "Device5", which here is the network participant 225. "Device5" has already been allocated to the "CloudKoppler4", i.e., the coupling unit 214, by means of the button 284.4. By means of the button 284.5, the operator could also revoke this allocation. By means of the button 284.3 or 284.7, the operator would have the ability to edit the settings of the network participant selected in the section 284.1 or 284.6, respectively. By means of the button 284.8, the operator can initiate the transmission of the device description data from the "Device5" selected in section 284.5—i.e., the network participant 225—to the currently-selected "CloudKoppler4"—i.e., the coupling unit 214. By means of the button 284.2, the operator can add an additional network participant. This shall be further discussed, with reference to FIG. 8.

Figure 8:
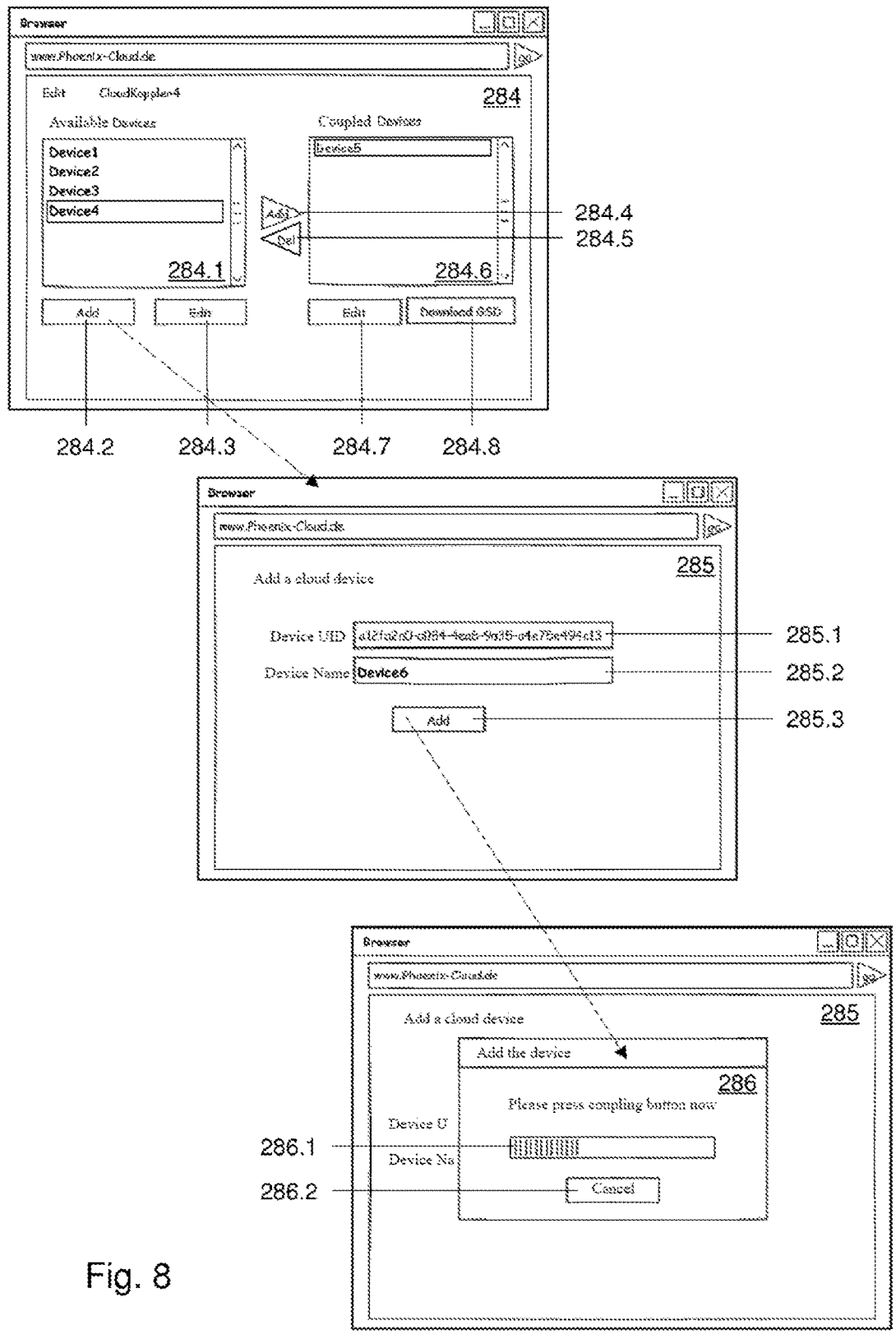
FIG. 8 illustrates a schematic representation of a graphical user interface of a cloud computing-based application interacting with the coupling unit, in various stages during the registration or disclosure of a network participant in the cloud computing-based application.

FIG. 8 illustrates, by way of example, a schematic representation of the graphical user interface of the cloud computing-based application interacting with the coupling unit 214, in various stages during the registration or disclosure of the network participant 236 in the cloud computing-based application.

The upper illustration in FIG. 8 again shows the view 284 of the user interface. By means of the button 284.2, the operator reaches the view 285 shown in the middle illustration in FIG. 8. The operator enters the UID of the network participant 236 in the field 285.1, and enters a name for the network participant 236, which here is "Device6", in the field 285.2. By means of the button 285.3, the operator starts the registration process for the network participant 236, and first reaches the view 286 shown in the lower illustration in FIG. 8. In the background, the cloud computing-based application makes contact with the network participant 236, on the basis of the entered UID. The operator must now activate a confirmation element configured on the network participant 236, for security reasons, in order to confirm the registration process. The progress bar 286.1 informs the operator of the progress of the registration process. By means of the button 286.2, the operator could also cancel the registration process.

After being successfully registered, the network participant 236 would appear first in the section 284.1 as "Device6" in the view 284, and could then also be allocated to the coupling unit 214 by means of the button 284.4. After the operator has initiated, by means of the button 284.8, the transmission of the device description data from the "Device6"—i.e., the network participant 236—to the currently-selected "CloudKoppler4"—i.e., the coupling unit 214, the setup of the coupling unit 214 would be completed. The coupling unit 214 would thus be able to emulate the network participants 225 and 236 in interaction with the cloud computing-based application, and to integrate same into the network infrastructure 210 as the network participants 215 and 216.

The operator can then configure the network infrastructure 210 in his or her desired engineering tool, e.g., PCWORX. It now appears to the operator as though the two control devices 225 and 236 of the remote pump stations and the central control device of the water works are participants of the local network structure.

The present invention also preferably provides for presenting the user interface of the cloud computing-based application directly within the engineering, in addition or alternatively to the display in a web browser. This simplifies the engineering of automation processes, which once again extend significantly beyond the limits of a local network infrastructure of one site.

The invention—in particular, the coupling unit—also makes it possible to remedy the problem where, according to the prior art, failure of the wide area network led immediately to the stopping of the entire automation process, because specific data of remote network participants would not be available in the local network infrastructure within a protocol-specifically defined period of time or at a protocol-specifically defined point in time.

The coupling unit according to the invention makes it possible for remote network participants to be emulated within the local network infrastructure, and therefore valid data is always available with regard to protocol-specific requirements, and the automation process can be continued even if the data link to the remote network participants is disturbed. The network participants emulated by the coupling unit always issue forth the most recently-received data. However, when necessary, it would also be possible to take measures here to recognize the existence of outdated data and trigger appropriate security responses.

LIST OF REFERENCE SIGNS

100 Network system
110 Network infrastructure
111 Network participant, control device
112 Network participant, field device
113 Network participant, field device
119 VPN gateway
120 Network infrastructure
121 Network participant, control device
122 Network participant, field device
123 Network participant, field device
129 VPN gateway
190 Wide area network, Internet
200 Network system
210 Network infrastructure
211 Network participant, control device
212 Network participant, field device
213 Network participant, field device
214 Coupling unit
214.1 First interface
214.2 Second interface
215 Emulated network participant
216 Emulated network participant
217 Emulated network participant
218 Emulated network participant
220 Network infrastructure
225 Network participant
230 Network infrastructure
236 Network participant
247 Network participant, virtual
258 Network infrastructure, hybrid
268 Network participant
280 Cloud computing infrastructure
281-286 Views of the user interface
290 Wide area network, Internet

What is claimed is:

1. A network system, comprising:
a first network infrastructure at a first local site having at least one first network participant that is configured as a control device;
a cloud computing infrastructure having at least one cloud computing-based application; and
a coupling unit having a first interface and a second interface,
wherein the coupling unit is connected by means of the first interface to the first network infrastructure, and by means of the second interface to the cloud computing infrastructure,
wherein, the coupling unit is equipped and designed to emulate at least one additional network participant of the first network infrastructure, in interaction with the at least one cloud computing-based application of the cloud computing infrastructure,
wherein the emulated at least one additional network participant represents a network participant of a remote network infrastructure not physically located at the first local site of the first network infrastructure, and
wherein the coupling unit enables the emulated at least one additional network participant to perform independent data processing and data transmission between the at least one first network participant and the emulated at least one additional network participant within the first network infrastructure without the need for data to first be exchanged between the emulated at least one additional network participant in the first network infrastructure and the corresponding network participant of the remote network infrastructure.

2. The network system according to claim 1, wherein the first network infrastructure is a fieldbus.

3. The network system according to claim 1, wherein the first network infrastructure comprises at least one second network participant, which is configured as a field device.

4. The network system according to claim 1, wherein the coupling unit is a unit within the control device, or wherein the coupling unit is a second or third network participant of the first network infrastructure, as a separate unit, and the emulated additional network participant is a third or fourth network participant of the first network infrastructure.

5. The network system according to claim 1, wherein data is transmissible within the first network infrastructure between all of the network participants, in accordance with a shared first communication protocol.

6. The network system according to claim 1, wherein the coupling unit is connected by means of the second interface to the cloud computing infrastructure via an intermediary second network infrastructure.

7. The network system according to claim 6, wherein data is transmissible within the second network infrastructure in accordance with a second communication protocol.

8. The network system according to claim 1, wherein the cloud computing infrastructure is additionally connected to a third network infrastructure, and wherein the cloud computing-based application further interacts with at least one network participant of a third network infrastructure.

9. The network system according to claim 8, wherein the network participant of the third network infrastructure is represented by the emulated additional network participant in the first network infrastructure.

10. The network system according to claim 1, wherein the cloud computing-based application is designed and adapted to provide a user interface for setting up the at least one coupling unit.

11. A coupling unit for a network system, which comprises a first interface and a second interface, wherein the coupling unit can be connected by means of the first interface to a first network infrastructure at a first local site, and by means of the second interface to a cloud computing infrastructure, and wherein the coupling unit is equipped and designed to emulate at least one network participant for the first network infrastructure, in interaction with a cloud computing-based application of the cloud computing infrastructure, wherein the emulated additional network participant represents a network participant of a remote network infrastructure not physically located at the first local site of the first network infrastructure or a virtual network participant or a hybrid network participant, and wherein the coupling unit enables the emulated at least one additional network participant to perform independent data processing and data transmission between the at least one first network participant and the emulated at least one additional network participant within the first network infrastructure without the need for data to first be exchanged between the emulated at least one additional network participant in the first network infrastructure and the corresponding network participant of the remote network infrastructure.

12. The coupling unit according to claim 11, wherein identification information about the coupling unit and identification information about the cloud computing infrastructure are stored in the coupling unit.

13. The coupling unit according to claim 12, wherein the coupling unit stores security information, and the coupling unit is equipped and designed to initiate secure data transmission to the cloud computing infrastructure with the use of the security information.

14. The coupling unit according to claim 12, wherein the coupling unit provides a confirmation element that can be activated in order to confirm a data transmission initiated from the cloud computing infrastructure in the presence of a connection to the second interface.

15. The coupling unit according to claim 11, wherein the coupling unit is equipped and designed to detect the presence of a connection to the second interface and, upon detection of the presence of a connection to the second interface, to initiate data transmission with the cloud computing infrastructure, with the use of the identification information of the coupling unit and the identification information of the cloud computing infrastructure.

16. The coupling unit according to claim 11, wherein the coupling unit is a unit within a first network participant of the first network infrastructure configured as a control device, or is an at least second network participant, as a separate unit, for the first network infrastructure.

17. A method for operating a network system which has a first network infrastructure at a first local site having at least one first network participant, comprising the following steps:
   providing a coupling unit, which comprises a first interface and a second interface;
   connecting the first interface of the coupling unit to the first network
   infrastructure;
   connecting the second interface of the coupling unit to a cloud computing
   infrastructure having at least one cloud computing-based application;
   emulating an additional network participant for the first network infrastructure, through the coupling unit, in interaction with the cloud computing-based application, wherein the emulated additional network participant represents a network participant of a remote network infrastructure not physically located at the first local site of the first network infrastructure; and
   independently processing and transmitting data between the at least one first network participant and the emulated additional network participant without the need for data to first be exchanged between the emulated additional network participant in the first network infrastructure and the corresponding network participant of the remote network infrastructure.

18. The method according to claim 17, wherein data is transmissible within the first network infrastructure between all of the network participants, in accordance with a shared first communication protocol.

* * * * *